(12) United States Patent
Ophardt et al.

(10) Patent No.: US 8,464,912 B2
(45) Date of Patent: *Jun. 18, 2013

(54) SPLIT ENGAGEMENT FLANGE FOR SOAP DISPENSER PUMP PISTON

(75) Inventors: Heiner Ophardt, Vineland (CA); Andrew Jones, Smithville (CA)

(73) Assignee: Gotohti.Com Inc., Beamsville, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/591,454

(22) Filed: Aug. 22, 2012

(65) Prior Publication Data

US 2013/0026190 A1     Jan. 31, 2013

Related U.S. Application Data

(63) Continuation of application No. 13/067,831, filed on Jun. 29, 2011, now Pat. No. 8,272,540, which is a continuation of application No. 11/881,754, filed on Jul. 30, 2007, now Pat. No. 8,002,150.

(51) Int. Cl.
 *B67D 7/76* (2010.01)
(52) U.S. Cl.
 USPC .............. 222/181.3; 222/321.6; 222/325
(58) Field of Classification Search
 USPC ........... 222/383.1, 518, 181.2, 181.3, 321.7, 222/321.8, 325, 321.6, 321.9, 509, 524–525; 403/329; 239/602, DIG. 12, 600
 See application file for complete search history.

(56) References Cited

U.S. PATENT DOCUMENTS

| | | |
|---|---|---|
| 2,466,899 A | 4/1949 | Kincaid |
| 2,858,052 A | 10/1958 | Costakos |
| 4,174,057 A | 11/1979 | Emery |
| 4,240,570 A | 12/1980 | Brown et al. |
| 4,505,409 A | 3/1985 | Armstrong |
| 5,165,577 A | 11/1992 | Ophardt |
| 5,431,309 A | 7/1995 | Ophardt |
| 5,836,482 A | 11/1998 | Ophardt et al. |
| 5,975,360 A | 11/1999 | Ophardt |
| 6,053,370 A | 4/2000 | Ludbrook et al. |
| 6,601,736 B2 | 8/2003 | Ophardt et al. |
| 7,225,948 B2 | 6/2007 | Ophardt et al. |
| 7,270,250 B2 | 9/2007 | Jones et al. |
| 8,002,150 B2 * | 8/2011 | Ophardt et al. ............ 222/181.3 |
| 2002/0015617 A1 | 2/2002 | Schwenkel et al. |
| 2006/0032871 A1 | 2/2006 | Ophardt et al. |
| 2006/0249538 A1 | 11/2006 | Ophardt et al. |
| 2007/0145077 A1 | 6/2007 | Harrold |
| 2009/0096836 A1 * | 4/2009 | Haines et al. .................. 347/49 |
| 2011/0147416 A1 * | 6/2011 | Nauels ....................... 222/181.3 |

* cited by examiner

*Primary Examiner* — Kevin P Shaver
*Assistant Examiner* — Robert Nichols, II
(74) *Attorney, Agent, or Firm* — Thorpe North & Western LLP

(57) ABSTRACT

A liquid soap dispenser having a permanent housing permits simplified insertion and replacement of disposable fluid reservoirs. The housing includes an actuator assembly which is cycled by a lever between first and second positions. The actuator assembly couples to a piston element of a piston pump carried on the reservoir. The piston element includes resiliently deformable fingers which act to secure the piston element to the actuator assembly for sliding movement therewith. If, on insertion of a replacement reservoir, the reservoir is positioned uncoupled from the actuator assembly, on first cycling of the actuator assembly the fingers deform to permit movement of the actuator assembly relative to the piston element and move towards a coupled orientation. In the coupled orientation, the fingers return to an undeformed configuration securing the piston element to the actuator assembly.

20 Claims, 12 Drawing Sheets

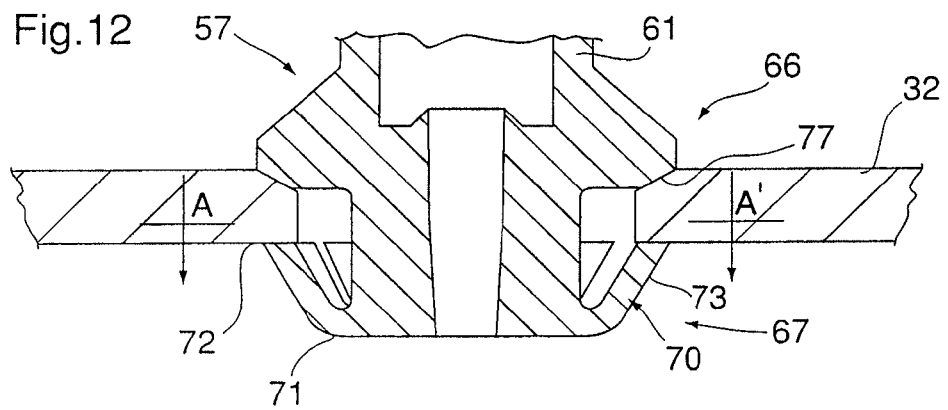
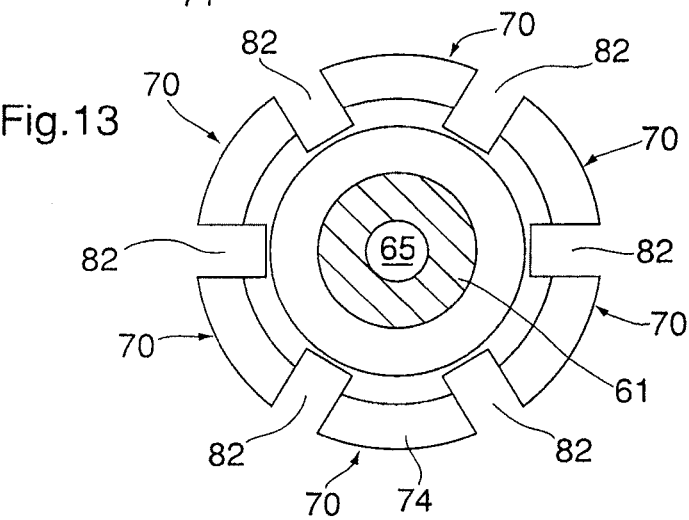
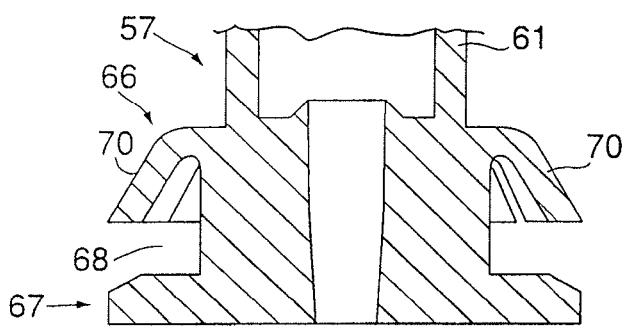
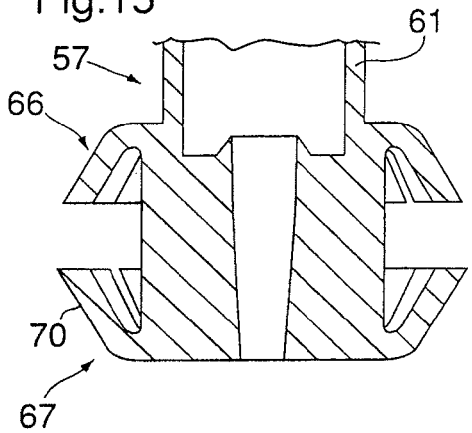

SPLIT ENGAGEMENT FLANGE FOR SOAP DISPENSER PUMP PISTON

RELATED APPLICATION

This application is a continuation of U.S. patent application Ser. No. 13/067,831 filed Jun. 29, 2011 now U.S. Pat. No. 8,272,540 which is a continuation of U.S. patent application Ser. No. 11/881,754 filed Jul. 30, 2007 which issued as U.S. Pat. No. 8,002,150 and claims the benefit of 35 U.S.C. 120.

SCOPE OF THE INVENTION

This invention relates generally to fluid dispensers and, more particularly, to a piston pump piston for a liquid soap dispenser which is adapted for simplified replacement of a liquid soap reservoir.

BACKGROUND OF THE INVENTION

Many of today's products sold in liquid form, such as liquid hand soap, are contained in disposable containers or reservoirs which incorporate a pump assembly. Typically, the pump assembly includes a reciprocally movable element which when moved dispenses a quantity of liquid soap from the reservoir. The reservoirs are generally fitted within a permanent housing which includes a movable actuator assembly which engages and reciprocally moves the movable element to dispense the fluid. This has been found to be both a convenient and economical means of fluid supply and dispensation. Since the fluid reservoirs are replaced once the fluid supply is exhausted, it is desirable to manufacture the dispenser and reservoir so as to make replacement of the fluid reservoir as easy and quick as possible.

Known fluid dispensers suffer the disadvantage in that replacement of the fluid reservoir is time consuming, as care must be taken to ensure the reservoir is placed in the permanent housing in the correct dispensing position to dispense fluids. If the reservoir is not placed in the correct dispensing position with the movable element coupled to the actuator assembly, the dispenser will be inoperative as the movement of the actuator assembly will not reciprocally move the movable element and no fluids will be dispensed. To achieve the proper dispensing configuration, the pump assembly must therefore be precisely aligned in the housing to ensure it is properly secured in or coupled to the actuator assembly.

Many known fluid dispensers suffer the further disadvantage in that to secure or couple the pump assembly to the actuator assembly of the housing, an adjustment of the position of the reciprocally movable element is often required.

Known fluid dispensers adapted to permit simplified replacement of the liquid soap dispenser provide for resilient fingers carried on the housing for complementary engagement with an engagement flange on the piston of a piston pump. The present inventors have appreciated that such arrangements suffer the disadvantage that the resilient members permanently on the housing must last the lifetime of the housing and, therefore, must be able to retain their resiliency for an extended period of time. While such resilient members may be made of resilient metal, they suffer the disadvantage that typically they are required to be separate parts for assembly at increased expense. Providing the resilient fingers to be of plastic has the disadvantage of requiring a plastic which will withstand its desired resiliency over a large number of cycles.

SUMMARY OF THE INVENTION

To at least partially overcome these disadvantages of known fluid dispensers, the present invention provides an improved arrangement for removably coupling a movable element of a piston pump to an actuator mechanism with resilient finger members circumferentially spaced about the movable element and extending from a radially inner end to a distal end for deflection by relative axial movement of the movable element and the actuator mechanism to assume a coupled orientation.

An object of the present invention is to provide a replaceable movable element in a pump mechanism with resilient coupling members.

The present invention provides in one aspect an improved fluid dispenser having a housing and a replaceable reservoir which incorporates as part of a fluid dispensing valve, a movable element. The housing includes a movable actuator assembly for coupling to the movable element. When the actuator assembly and movable element are coupled, the movement of the actuator assembly moves the movable element to dispense fluid from the reservoir. The actuator assembly is configured such that if the reservoir is inserted into the housing in a position uncoupled from the actuator assembly, the first activation of the dispenser moves the actuator assembly relative to the movable element to a position where the movable element and actuator assembly are secured together in a coupled orientation. The dispenser permits insertion of a replaceable reservoir therein regardless of the initial position of the movable element.

The present invention, in one preferred aspect, provides a fluid dispenser which includes a replaceable reservoir and a permanent housing. The housing is configured to support the reservoir in a dispensing position. The reservoir includes a chamber for holding fluids and a portioning valve which includes a reciprocally movable element, the movement of which dispenses a predetermined amount of fluid outwardly from the chamber. The housing includes an actuator assembly movable between first and second positions. The actuator assembly is adapted for coupling to the reciprocally movable element, wherein in a coupled orientation the movement of the actuator assembly moves the movable element to dispense fluid. The actuator assembly is further configured such that if the reservoir is inserted into the housing with the reciprocally movable element uncoupled, so that the movable element and actuator assembly may move independently, on first cycling of the actuator assembly, the actuator assembly is moved relative to the reciprocally movable element to secure it thereto. By cycling of the actuator assembly, it is generally meant the movement of the actuator assembly from the first position to the second position and back to the first position during the normal operation of the dispenser.

The dispenser of the present invention advantageously permits easy replacement of the reservoir, as it is not required to precisely align the reciprocally movable element with the actuator assembly to ensure the reservoir is inserted into the housing with the movable element and actuator assembly in a coupled orientation. Additionally, as there is no need to adjust the position of the reciprocally movable element on the insertion of the reservoir, the disadvantages of inoperative arrangement and/or premature dispensation or escape of fluids from the chamber are eliminated.

The reciprocally movable element includes a catch assembly. The catch assembly is configured to permit movement of the actuator assembly relative to the reciprocally movable element from a position where the actuator assembly and the reciprocally movable element are in an uncoupled orientation, to a position where the actuator assembly and the reciprocally movable element are in a coupled orientation. Once in the coupled orientation, the catch assembly prevents movement of the actuator assembly relative to the movable element to return to the uncoupled orientation.

Preferably, the reciprocally movable member is a piston element which, on insertion of the reservoir into the housing, is positioned coaxially aligned with the actuator assembly. The piston element includes a catch mechanism with at least one resilient member. A catch portion of the actuator assembly is to be engaged with the catch mechanism of the piston element to couple the piston element to the actuator assembly in a coupled orientation. However, in initial insertion of the reservoir into the housing, the piston element may be located relative to the catch portion of the actuator assembly in an uncoupled orientation, however, with the piston element in the uncoupled orientation located in a path of the catch portion of the actuator assembly through which the catch portion of the actuator assembly moves in the cyclical movement of the actuator assembly.

The resilient member on the piston element is deflectable on movement of the catch portion of the actuator assembly into the piston element to permit coupling of the catch portion of the actuator assembly with the piston element to assume the coupled orientation from the uncoupled orientation. With this arrangement the first cycling of the actuator assembly moves the actuator assembly relative to the piston element, deflecting the resilient member on the piston element to couple the piston element to the actuator assembly in the coupled orientation.

The catch mechanism on the piston element preferably comprises an annular engagement slot preferably between a pair of radially outwardly extending engagement flanges carried on the piston element with the catch portion of the actuator assembly to be received in the engagement slot. One of the engagement flanges preferably comprises the resilient member which extends radially of the piston element circumferentially about the piston element. Deflection of the resilient member permits the catch portion of the actuator assembly to move past the resilient member into coupled engagement within the slot yet with the resilient member on assuming its unbiased condition preventing removal of the catch portion of the actuator assembly from the slot by movement of the catch portion along the path the catch portion moves in the cyclical movement of the actuator assembly. The resilient member may comprise a set of resilient finger members disposed circumferentially about the piston element extending radially outwardly from inner ends of the finger member by which they are coupled to the piston element at a distal end, and sized to be deflected radially inwardly to pass through an opening in the actuator member then return to their unbiased positions larger than the opening to capture the actuator member.

Preferably, each finger member projects angularly from the piston element such that a leading surface of each finger member forms a camming surface. With the piston and actuator assembly in an uncoupled orientation, the first cycling of the dispenser moves the camming surfaces into contact with the actuator member to assist in moving the finger members to the biased position. When the actuator member is fully within engagement slot and the fingers members return to the unbiased position, a trailing edge or surface of the finger members engage the actuator member to couple the piston element to the actuator assembly.

BRIEF DESCRIPTION OF THE DRAWINGS

Further objects and advantages of the invention will appear from the following description taken together with the accompanying drawings in which:

FIG. 12 is a schematic cross-sectional side view of the outer end of the piston element of the pump assembly shown in FIG. 10;

FIG. 13 is a cross-sectional view of the outer end of the piston along section line A-A' in FIG. 12; and FIGS. 14 to 18 are side views the same as that shown in FIG. 12 of an outer end of a piston element, however, each differently modified over the piston element shown in FIG. 12.

DETAILED DESCRIPTION OF THE DRAWINGS

Figure 1:
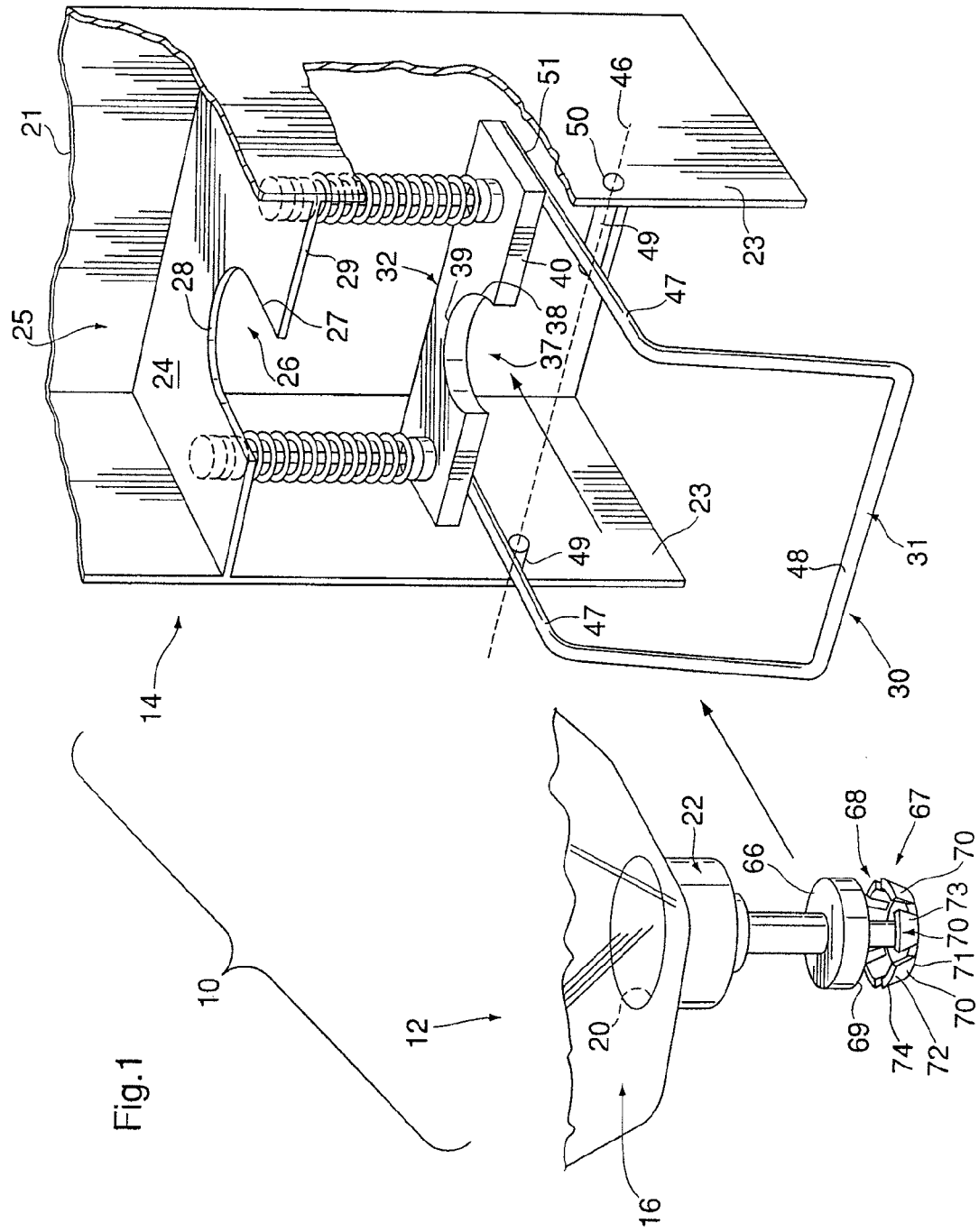
FIG. 1 is an exploded partial perspective view of a first preferred embodiment of a housing and reservoir of a dispenser in accordance with the invention illustrating a reservoir ready for insertion by relative horizontal movement.

Reference is made first to FIG. 1 which shows a dispenser 10 in accordance with a preferred embodiment of the invention. The dispenser 10 comprises a reservoir 12, and a housing 14.

The reservoir 12, only partially shown, comprises a chamber 16 for holding fluid 18 as, for example liquid soap, which is to be dispensed. An outlet 20 is provided through a lowermost wall 17 of the chamber 16, across which is located a valve assembly 22 to regulate the flow of fluid 18 outwardly therethrough. Preferably the reservoir 12 is made entirely of plastic and is disposable once the supply of fluid 18 is exhausted.

FIG. 1 shows the housing 14 in an open configuration ready for insertion of the reservoir 12. The housing 14 includes a backplate 21 typically adapted for permanent attachment to a wall. A pair of side walls 23 extend vertically forwardly from each side of the backplate 21. A support flange 24 is provided extending horizontally between the side walls 23 so as to define a cavity 25 above the flange 24 between the side walls 23 and backplate 21 to receive the reservoir 12.

The flange 24 has an opening 26 vertically therethrough in the form of a U-shaped slot 27 closed at a rear blind end 28 and open forwardly to the front edge 29 of the flange 24.

An actuator assembly 30 is provided on the housing 14, movable relative to the housing. The actuator assembly 30 includes notably a pivoting lever 31 and an actuator plate 32 mounted to the housing to be vertically slidable. Pivoting of the lever 31 moves the vertically slidable actuator plate 32 linearly on a pair of vertically extending guide rods 33 against the bias of springs 34 disposed about the guide rods 33. The actuator plate 32 has a downwardly directed lower surface 35 and an upwardly directed upper surface 36, each extending normal to the linear path of movement of the actuator plate 32.

The actuator plate 32 has a catch opening 37 vertically therethrough in the form of a U-shaped slot 38 closed at a rear blind end 39 and open forwardly to the front edge 40 of the actuator plate 32.

The two parallel spaced locating rods 33 are fixedly secured at their upper ends 41 to flange 24 and extend downwardly to their lower ends 42 to which respective retaining ferrules 43 are secured. The actuator plate 32 has a pair of cylindrical bores 44 through which the rods 33 pass. The actuator plate 32 is disposed on the rods 33 above the ferrules 43.

Springs 34 are provided about each of the locating rods 33. The springs 34 have an upper end which engage the flange 24 and a lower end which engage the upper surface 36 of actuator plate 32 to resiliently bias the actuator plate 32 away from the flange 24 downwardly toward a fully extended position shown in FIGS. 1 to 3.

The actuator assembly 30 includes the lever 31 which is pivotally connected to the housing 14 for pivoting about a horizontal axis 46. The lever 30 is U-shaped having a pair of side arms 47 connected at their front by a horizontal connecting bight 48. A pair of horizontal stub axles 49 extend laterally outwardly from the side arms 47 and are received in holes 50 through the side walls 23 to journal the lever 31 to the housing for pivoting about an axis 46.

A rear end 51 of the lever 31 engages the lower surface 35 of the actuator plate 32. Manual urging of the bight 48 of the lever 31 rearwardly by a user moves the actuator plate 32 upwardly against the bias of the springs 33 from the extended position shown in FIG. 2 to a retracted position shown in FIG. 4. On release of the lever 31, the force of the springs 33 returns the actuator plate 32 to the extended position.

The opening 26 of the flange 24 is positioned to permit the reservoir 12 to be slid rearwardly inward into the housing 14, in the manner illustrated in FIG. 1. The flange 24 is located such that when the reservoir 12 is slid into the housing 14, the flange 24 abuts and supports the lowermost wall 17 of the fluid chamber 16 to assist in maintaining the reservoir 12 in fluid dispensing position. The flange 24 is received in a slotway 52 between the lowermost wall 17 of the fluid chamber 16 and an upwardly directed shoulder 53 on the valve assembly 22 such that the flange 24 is sandwiched between the wall 17 and the valve assembly 22, thereby preventing axial sliding movement of the reservoir 12 as the dispenser 10 is used. The U-shape of the opening 26 of the flange 24 assists in guiding the reservoir 12 as it is inserted into and removed horizontally from the housing 14.

Figure 2:
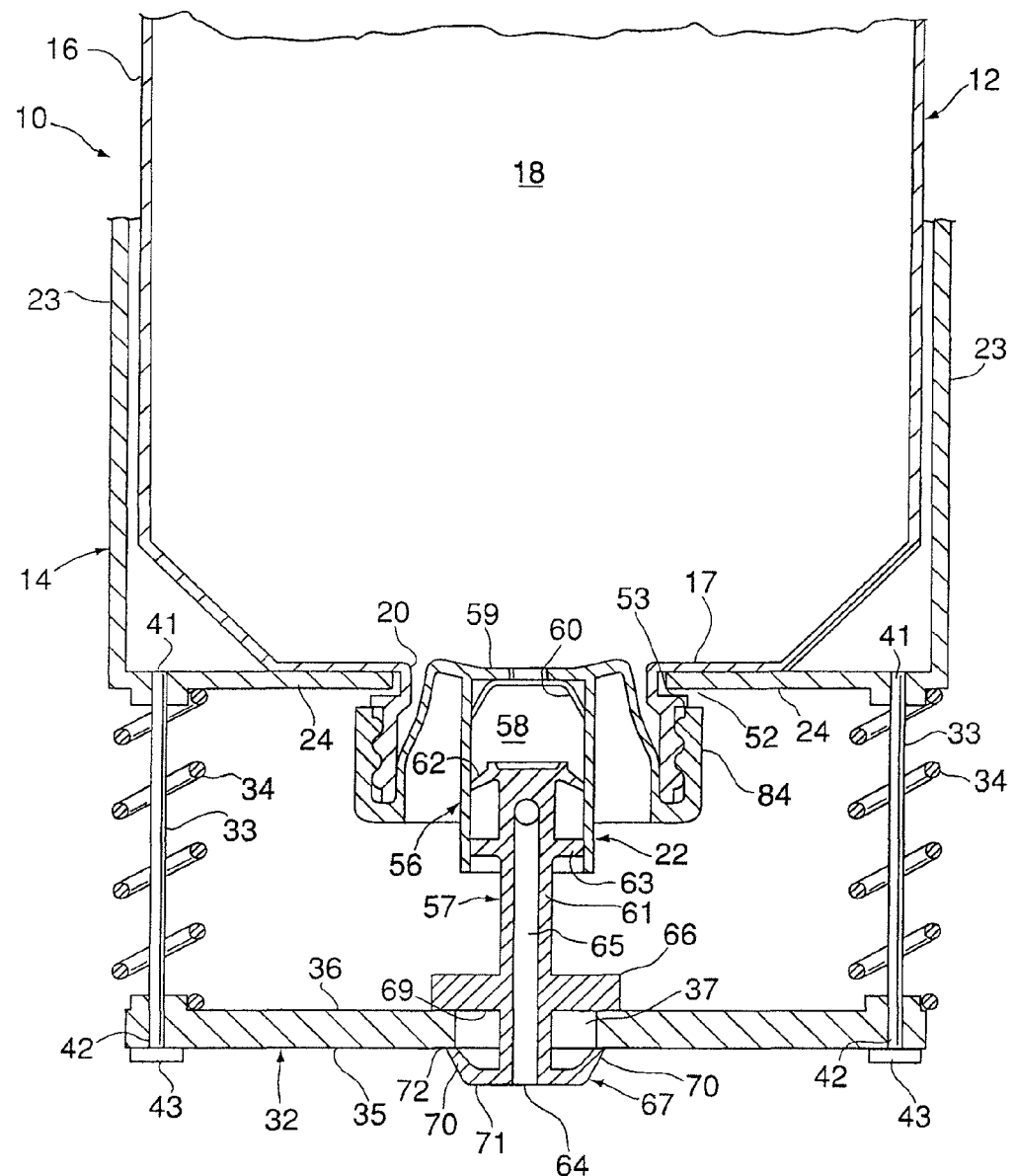
FIG. 2 is a partial cross-sectional front view of the housing and reservoir of FIG. 1 in a coupled orientation with an actuator assembly of the housing and a reciprocally movable piston element of the reservoir in a fully extended rest position.

FIG. 2 best shows the reservoir valve assembly 22 as comprising a piston pump of the type described in U.S. Pat. No. 5,165,577 to Ophardt issued Nov. 24, 1992. The valve assembly 22 includes piston chamber forming member 56 and a piston element 57. The piston chamber forming member 56 forms a dispensing chamber 58 having at an inwardmost end an inlet opening 59 opening into the chamber 16. A one-way inlet valve 60 is provided across the inlet opening 59 which permits fluid 18 to flow outwardly from the chamber 16 into the dispensing chamber 58 but prevents flow from the dispensing chamber 58 to the chamber 16. The reciprocally movable piston element 57 is slidably received within the dispensing chamber 58 and has an axially extending hollow stem 61 which carries a flexible inner flange 62 and an outer sealing flange 63 to engage the inner wall of the dispensing chamber 58 in a manner that reciprocal movement of the piston element 57 along a linear path axially in the dispensing chamber 58 causes fluid 18 to flow from the chamber 16 outwardly past the one-way valve 60 and out an outermost end 64 of the piston element 57 via an internal passageway 65 through the stem 61.

The piston element 57 has on the stem 61 proximate its outermost end 64 a catch assembly comprising both an inner engagement member 66 and an outer engagement member 67 axially spaced from each other by an annular slotway 68 axially therebetween. The inner engagement member 66 a generally circular and radially extending flange presenting an outwardly directed shoulder 69. The outer engagement member 67 comprises a plurality of circumferentially spaced resilient finger members 70, each of which is coupled to the stem 61 at a radially inner end 71 and extend radially outwardly and axially inwardly to a distal end 72. Each finger member 70 on the outer engagement flange 67 presents an axially outwardly and radially outwardly directed camming surface 73. Each finger member 70 has at its distal end 72 an inwardly directed shoulder 74. Each finger member 70 has an inherent bias to assume an extended position as seen in FIGS. 1 to 5 but to be deflectable to have its distal ends deflected radially inwardly.

Figure 3:
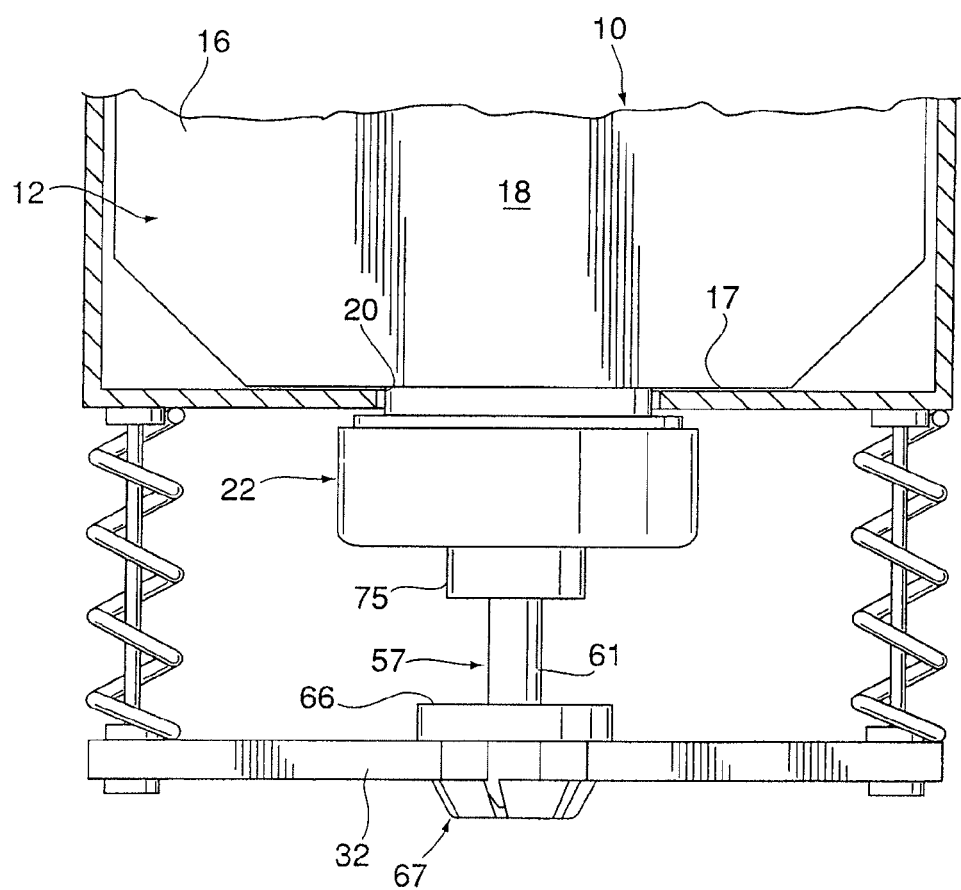
FIG. 3 is a front view of the housing and reservoir as in FIG. 2.
Figure 4:
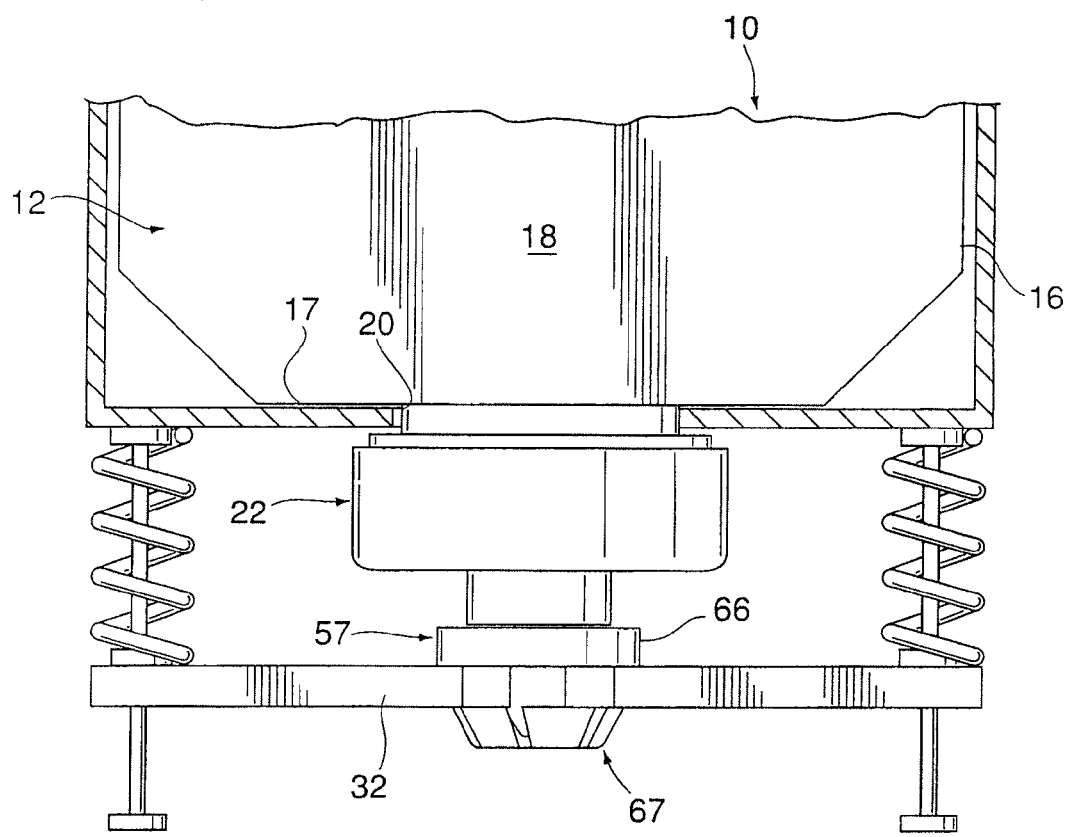
FIG. 4 is a front view of the housing and reservoir in the coupled orientation as in FIG. 2 but with the actuator assembly and the piston element in a fully retracted position.

As seen in a coupled orientation in FIGS. 2 to 4, the piston element 57 is to be engaged with the actuator plate 32 with the actuator plate 32 disposed about the stem 61 within the slotway 68 sandwiched between the inner engagement member 66 and the outer engagement member 67. In this regard the outwardly directed shoulder 69 of the inner engagement member 66 is of a greater diameter than the catch opening 37 such that the outwardly directed shoulder 69 is in opposition to the and engages the inwardly directed upper surface 36 of the actuator plate 32. The finger members 70 of the outer engagement member 67 in the extended position are of a greater radius than the catch opening 37 such that the inwardly directed shoulder 74 is in opposition to and engages the outwardly directed lower surface 35 of the actuator plate 32.

With the piston element 57 engaged with the actuator plate 32 as seen in FIGS. 2 to 4, reciprocal movement of the actuator plate 32 between the extended position and the retracted position results in corresponding movement of the piston element 57 to dispense fluid from the reservoir.

From the position shown in FIG. 1 with the actuator plate 32 in the extended position and with the piston element 57 in the extended position, horizontal rearward sliding of the entirety of the reservoir 12 will permit the flange 24 to be received in the slotway 52 between the lowermost wall 17 of the fluid chamber 16 and the upwardly directed shoulder 53 and the actuator plate 32 to slide horizontally into the catch opening 37 of the actuator plate 32 with the actuator plate 32 in the annular slotway 68 between the inner engagement member 66 and the outer engagement member 67. In this manner, the piston element 57 comes to be received with the catch opening 37 of the actuator plate and the piston element 57 is thus coupled to the actuator plate 32 in a coupled orientation as seen in FIGS. 2 to 4 for movement of the piston element 57 with the actuator plate 32.

Figure 5:
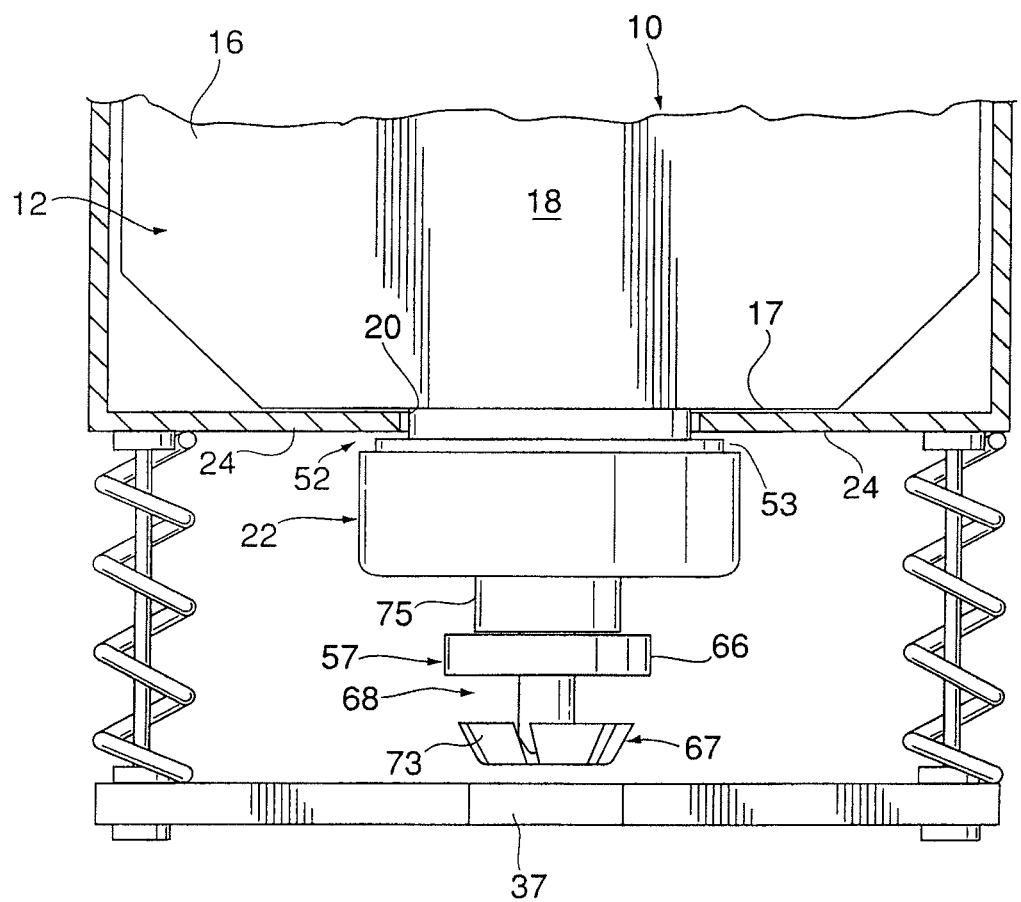
FIG. 5 is a front view of the housing and reservoir of FIG. 1 in an uncoupled orientation with the activator assembly in the fully extended rest position and the piston element in the fully retracted position.

Reference is made to FIG. 5 which illustrates a situation which arises when the reservoir 12 is in inserted into the housing 14 with the piston element 57 in a fully retracted position. The flange 24 of the housing is received in the slotway 52 between the lowermost wall 17 and the upwardly directed shoulder 53 of the valve assembly 22. However, with the piston element 57 in the retracted position, the outer engagement member 67 of the piston element 57 is disposed vertically above the catch opening 37 of the actuator plate 32. From the position of FIG. 5, in first operation of the dispenser, that is, as by manual movement of the lever 31, the actuator plate 32 is moved from its position below the outer engagement member 67 vertically upwardly as indicated by the arrow in FIG. 6. The sides of the U-shaped slot 38 forming the catch opening 37 engage the resilient finger members 70 of the outer engagement member 67. With such engagement, the resilient finger members 70 are deflected radially inwardly permitting the actuator plate 32 to move upwardly to above the resilient finger members 70. Once the actuator plate 32 is disposed upwardly from the spaced resilient finger members 70, the finger members 70 under their inherent bias expand radially outwardly to assume their unbiased position adopting a coupled configuration in the fully retracted position the same as that shown in FIG. 4.

It is appreciated that the engagement between the circumferential upper edge of the U-shaped slot and the outwardly directed camming surface 73 on each finger member 70 will with upward movement of the actuator plate 32 displace each finger member 70 such that its distal end 72 is displaced radially inwardly permitting the actuator finger members 70 to pass downwardly through the catch opening 37 until the upper distal ends 72 of the finger members 70 come to be below the lower surface 35 of the actuator plate 32 and then expand radially outwardly under their inherent bias.

Figure 6:
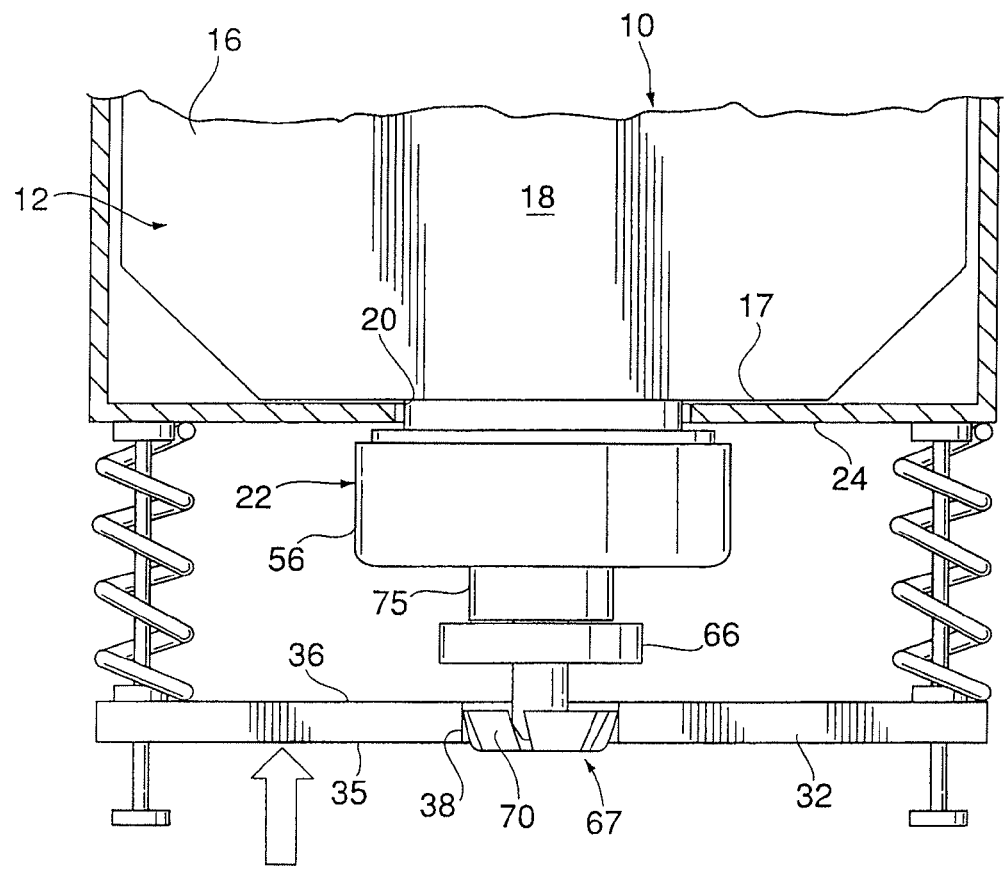
FIG. 6 is a front view housing and reservoir as in FIG. 5 but with the actuator assembly moved from fully extended rest position partially towards the fully retracted position to engage the piston element.

In the actuator plate 32 moving upwardly as illustrated by the arrow in FIG. 6, the actuator plate 32 on first engagement with the finger members 70 will urge the piston element 57 upwardly, as possible, to place the piston element 57 in a fully retracted position in which upward movement of the piston element 57 relative to the piston chamber forming member 56 is prevented as by the inner engagement member 66 engaging an outwardly directed surface 75 on the piston chamber forming member 56.

With the piston element 57 in the coupled orientation coupled to the actuator plate 32, in a cycle of operation after manual release of the lever 31, the springs 33 will return the actuator plate 32 and the piston element 57 together to the extended position.

Figure 7:
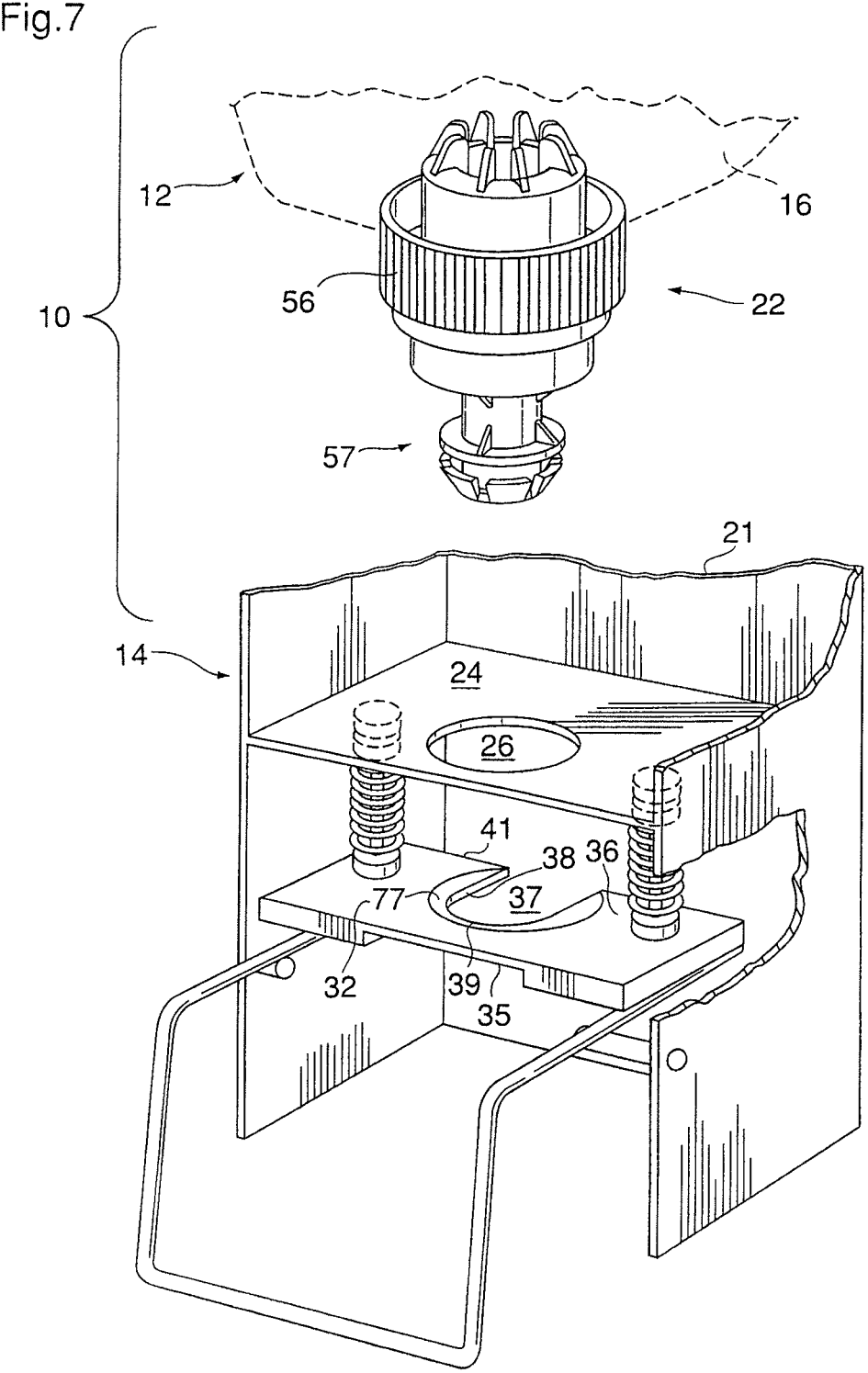
FIG. 7 is an exploded partial perspective view of a second preferred embodiment of a housing and reservoir of a dispenser in accordance with the invention illustrating a reservoir ready for insertion by relative vertical movement.
Figure 8:
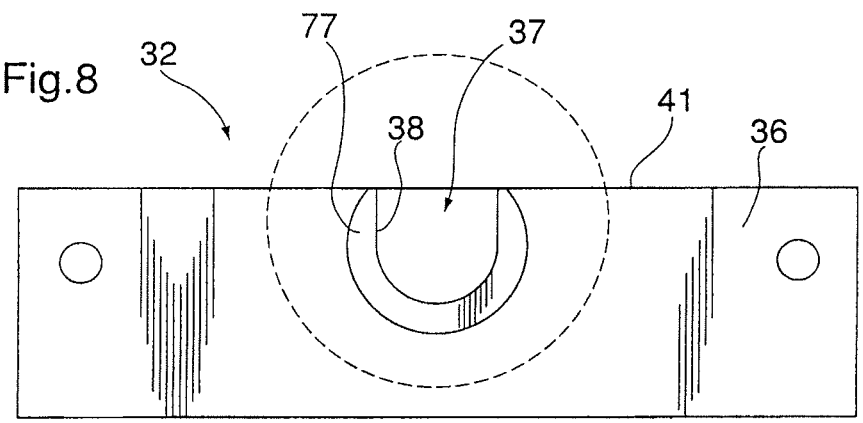
FIG. 8 is a plan view of the actuator plate of the housing in FIG. 7.

Reference is made to a second embodiment of a dispenser 10 as illustrated in FIGS. 7 and 8 in which similar elements to those in the first embodiment are referred to by similar reference numbers. The embodiment of FIGS. 7 to 8 is adapted for coupling of the reservoir 12 to the housing 14 by vertical sliding of the reservoir 12 relative to the housing 14.

In this regard, the support plate 24 of the housing 14 is provided with an opening 26 vertically therethrough which is circular. The reservoir valve assembly 22 of the second embodiment is shown in pictorial end view in FIG. 10 and pictorial side view in FIG. 11. The piston chamber forming member 56 has a stepped outer surface with a cylindrical portion 76 ending at its outer end at an enlarged radius axially directed shoulder 77. The opening 26 through the flange 24 is closely sized to the outer cylindrical portion 76 and the reservoir 12 when inserted vertically down onto the flange 24 has the cylindrical portion 76 pass downwardly through the opening 26 with the shoulder 77 which is of a greater diameter than the opening 26 sit on the upper surface of the flange 24. The actuator plate 32 has a catch opening 37 vertically through therefore in the shape of a U-shaped slot 38 closed at a forward blind end 39 and open rearwardly to the rear edge 41 of the actuator plate 32. About the catch opening 37 is a camming chamfered surface 77 disposed to extend downwardly and radially inwardly. The cylindrical portion 76 of the piston chamber forming member 56 carries a radially outwardly extending boss 78 sized to be marginally smaller than the circular opening 26 through the flange 24 such that vertical downward insertion of the cylindrical portion 76 through the opening 26 requires downward forces to snap the boss 78 through the opening 26 and the boss 78 engages under the flange 24 resisting relative movement of the piston chamber forming member 56 upwardly other than by the application of some considerable manual force.

On insertion of the reservoir 12, the pump assembly 22 is moved coaxially downwardly through the opening 26 in which case the piston element 57 is disposed above the catch opening 37 of the actuator plate 32. To the extent the piston element 57 is in an extended position, engagement between the actuator plate 32 and the outer engagement member 67 will move the piston element 57 relative the piston chamber forming member 56 towards its retracted position. With the pump assembly 22 fixedly secured to the flange 24, the piston element 57 is in an uncoupled orientation. With first manual movement of the lever 31, the actuator plate 32 is moved upwardly with the outer engagement member 67 being engaged by the catch opening 37. Engagement between the chamfered surface 77 of the actuator plate 32 about the catch opening 37 and the radially outwardly directed camming surface 73 on the finger members 70 biases the finger members 70 radially inwardly on moving of the actuator plate 32 upwardly until the finger members 70 clear the under surface 35 of the actuator plate 32 and the actuator plate 32 becomes captured between the inner engagement member 66 and the finger members 70 of the outer engagement 67.

In an alternative manner of insertion, with the piston member 57 in a fully extended position, the reservoir 12 is inserted downwardly through the opening 26 of the flange 24, however, tilted at an inclined angle such that the piston element 57 extends rearwardly towards the rear wall 21 and becomes located rearwardly of the open rear end of the U-shaped slot 38 of the catch opening 37. Subsequently, the reservoir 12 is tilted from an inclined position to assume a vertical position thus pivoting the piston element 57 to move forwardly with the actuator plate 32 to become engaged between the inner engagement member 66 and the outer engagement member 67 thus assuming a coupled orientation.

Reference is made to FIG. 8 which shows a top view of the actuator plate 32 upon which has been superimposed as a dashed circle a schematic representation of the relative coaxial location of the opening 26 of the flange 24.

Figure 9:
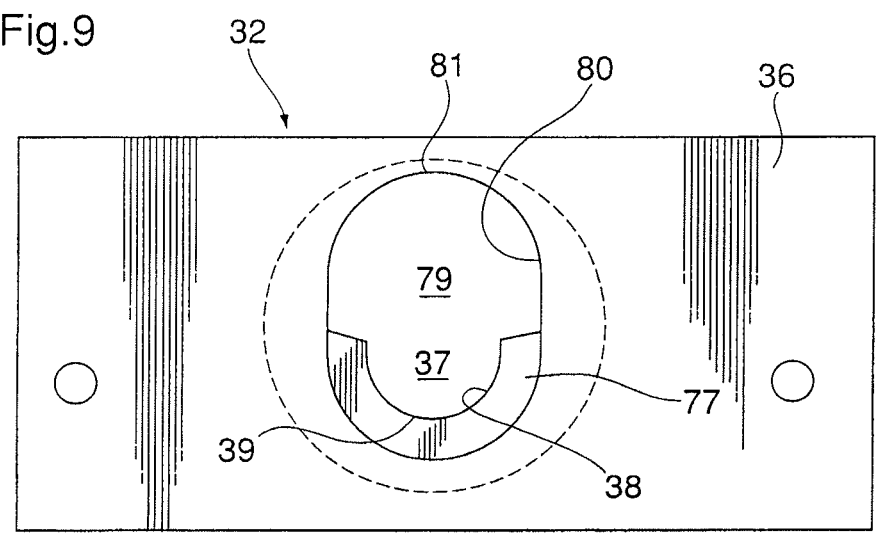
FIG. 9 is a plan view of a first alternate actuator plate for substitution for the actuator plate of FIG. 8.

Reference is made to FIG. 9 which shows an alternative actuator plate 32 for replacement of the actuator plate shown in FIGS. 7 and 8. The actuator plate 32 in FIG. 9 has a catch opening 37 therethrough in the form of a U-shaped slot 38 closed at a front blind end 39 and open rearwardly. A chamfered surface 77 which tapers radially inwardly and downwardly is disposed about the U-shaped slot 38. At the rear of the catch opening 37, an access opening 79 is provided through the actuator plate 32. The access opening 79 is in the form of a U-shaped slot 80 closed at a blind end 81 and opening forwardly into the catch opening 37. The access opening 79 is sized to permit the inner engagement member 66 and the outer engagement member 67 to pass therethrough rearward of the catch opening 37 and subsequent movement forwardly with piston element 57 to become engaged with the catch opening 37.

Figure 10:
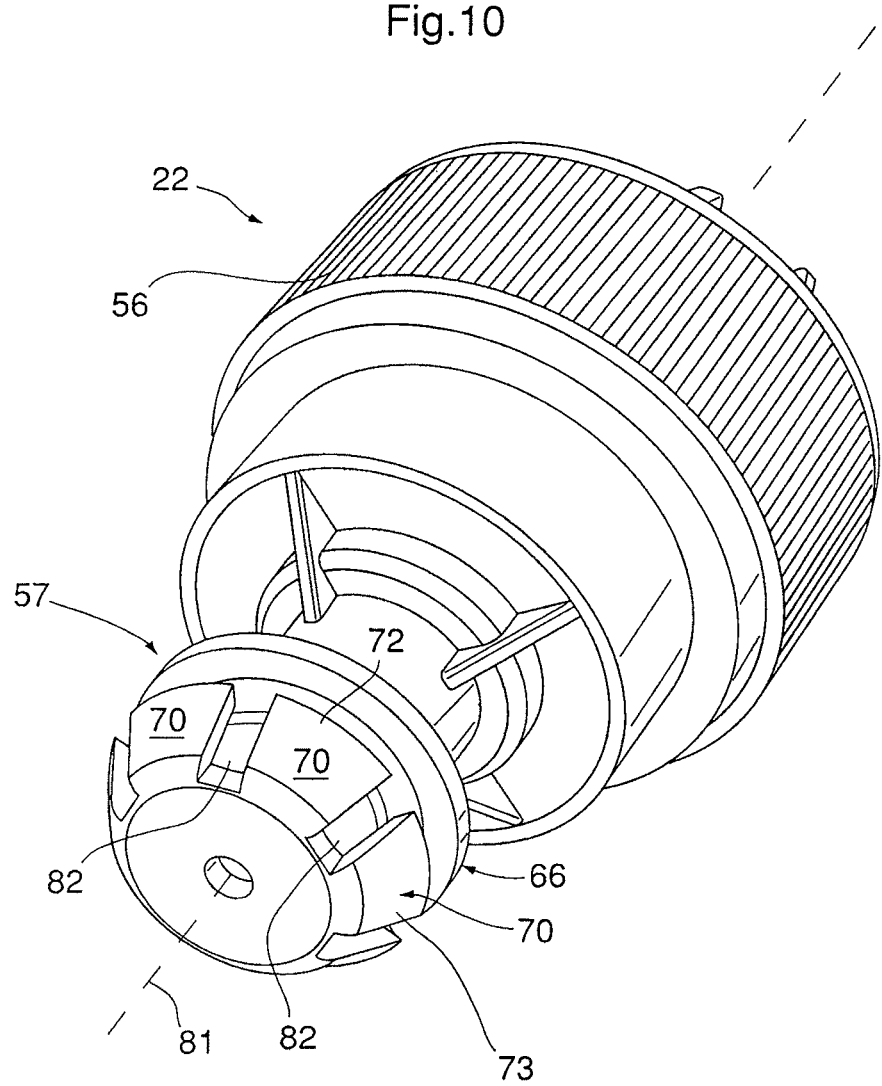
FIG. 10 is a pictorial bottom view of the pump assembly shown in FIG. 7.
Figure 11:
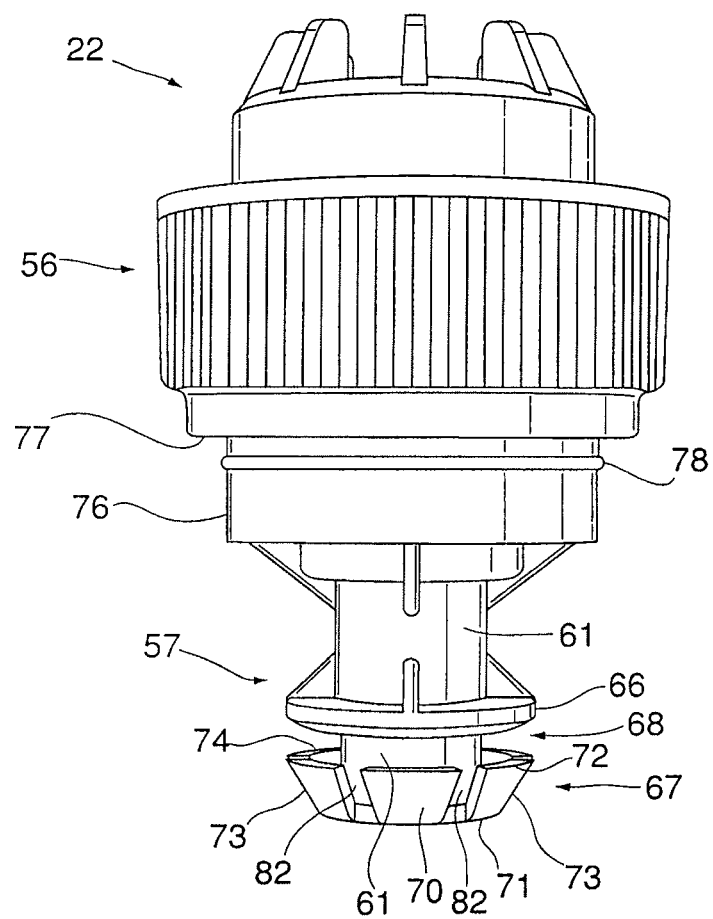
FIG. 11 is a pictorial side view of the pump assembly shown in FIG. 10.

Reference is made to FIGS. 10 and 11 which best show the resilient finger members 70. In the preferred embodiment, six finger members 70 are provided each representing an equal segment about a central axis 81 through the piston element 57 and each disposed uniformly spaced from each other by a slot 82.

The slot 82 is of a circumferential extent that the distal ends 72 of the finger member 70 may be deflected radially a sufficient extent for the finger members 70 to pass through the catch opening 37 without circumferential side portions of the distal ends 72 of adjacent finger members 70 engaging. Providing the finger members 70 to extend circumferentially about the outer end of the piston element 57 permits the piston element 57 to have fingers 70 which will engage with the periphery of the U-shaped slot 38 of the catch opening 37 irrespective of the relative rotational position of the piston element 57 within the piston chamber forming member 56.

Reference is made to FIG. 14 which is a cross-sectional side view similar to FIG. 12, however, showing a third embodiment of a piston element 57 with a reversed arrangement in which the outer engagement member 66 is a relatively rigid inflexible disc and the inner engagement member 67 comprises the plurality of spaced resilient finger members 70. The configuration of FIG. 14 is useful in the situation in which the piston element 57 may be inserted into an uncoupled orientation in which the actuator member 32 is disposed inwardly of the inner engagement member 67, for example, with a stem 61 inwardly from the inner engagement member 67 passing through the catch opening 37.

Reference is made to FIG. 15 which is a cross-sectional side view similar to FIG. 12, however, showing a fourth embodiment of a piston element 57, however, in which both the inner engagement member 66 and the outer engagement 67 comprise a plurality of spaced resilient finger members 70 with the configuration of FIG. 15 permitting the piston element 57 to be in unconfigured conditions either above or below catch opening 37 of the actuator plate 32 in initial positioning and with which an axial sliding of the piston element 57 axially through the catch opening 37 the one of the inner engagement member 66 and the outer engagement member 67 engaging the catch opening 37 will have its finger members 70 deflect inwardly so that the actuator plate 32 becomes secured in the annular slotway 68.

The preferred embodiments illustrated, for example, in each of FIGS. 12, 14 and 15 is preferably injection moulded from a plastic material as a unitary element. The entirety of the reservoir 12 and its pump assembly 22 is disposable as a unit after the contents of the reservoir have been dispensed. The resilient fingers 70 of the piston element 57 therefore merely need to have resiliency which permits coupling with the actuator plate 32 once or at least not more than a few times since an individual reservoir 22 with its disposable pump assembly 22 is typically only expected to be coupled to the housing a single time. Thus, the plastic materials from which the resilient fingers 70 are constructed need not be capable of being deflected any significant number of times and still retain their resiliency. Thus, the resilient fingers 70 may be formed from a relatively inexpensive plastic material which while having some inherent resiliency need not maintain that resiliency over repeated cycles of deflection. The piston element 57 or at least substantial portions thereof including the inner and/or engagement members 66, 67 which carries the resilient fingers 70 may preferably be formed as a substantially unitary element from plastic material as by injection moulding.

The piston element 57 permits the sliding insertion of the reciprocally movable piston element 57 into the catch opening 37 of the actuator plate 32 either into an orientation where the catch opening 37 and piston element 57 are coupled for movement together, as shown in FIGS. 2, 3 and 4, or an uncoupled orientation where the piston element may move independently from the actuator plate 32 shown in FIG. 5.

In the coupled orientation, the pivotal movement of the lever 31 axially moves the catch plate 32 and piston element 57 between the first rest, extended position and the second fully retracted position to dispense a quantity of fluid 18. If the reservoir 12 is inserted with the piston element 57 in the uncoupled orientation of FIG. 5, the first movement of the lever 31 moves the catch plate 32 relative to the piston element 57 until the piston element 57 engages the catch plate 32 and assumes the coupled orientation of FIG. 5. In this manner, the dispenser 10 is operative to dispense fluid 18 regardless of whether the piston element 57 is initially inserted into the housing 14 either coupled or uncoupled to the catch plate 32.

To dispense fluid 18, the actuator assembly 30 is cycled by the pivotal movement of the lever 31 moving the piston element 57 from the first rest, extended position shown in FIG. 2 to the second retracted position shown in FIG. 3 and released with the springs 34 returning the actuator plate 32 back to the first rest, extended position to complete the cycle.

The dispenser 10 of the present invention advantageously permits insertion of the reservoir 12 into the housing without the requirement of ensuring the piston element 57 is in a particular position relative to its piston chamber forming member 57 or the catch plate 32.

Figure 16:
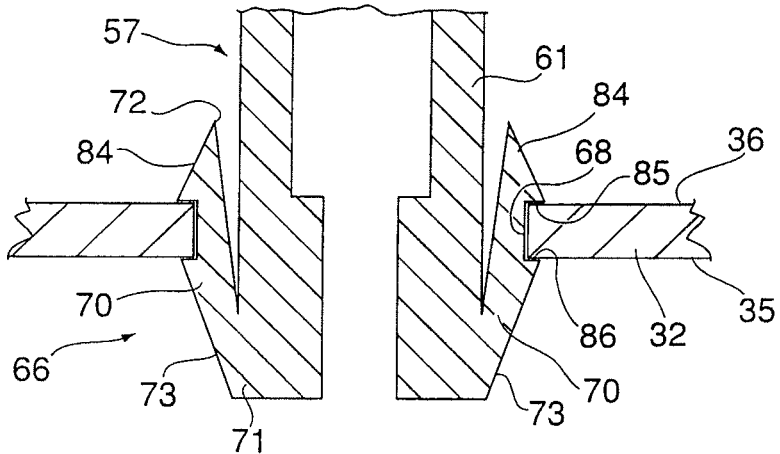

Reference is made to FIG. 16 which is a cross-section similar to that shown in FIG. 12, however, showing a fifth embodiment of a piston element 57 in which a single outer engagement member 66 is provided comprised of resilient finger members 70. Each finger member 70 carries a short radially inwardly extending, circumferential portion of an annular slotway 68 disposed between an axially outwardly and radially outwardly directed outer camming surface 73 and an axially inwardly and radially outwardly directed inner camming surface 84. If the finger members 70 are above the activation plate 32, then on moving the piston element 57 downwardly coaxially into the catch opening 37, the outer camming surface 73 engages the perimeter of the catch opening 37 and is biased radially inwardly until the an inner shoulder 85 of the slotway 68 is above the upper surface 36 of the activation plate 32 and the finger members 70 may then snap outwardly under their bias to capture the activation plate 32 in the slotway 68. If the finger members 70 are below the activation plate 32, then on moving the piston element coaxially upwardly into the catch opening 37, the inner camming surface 84 engages the perimeter of the catch opening 37 and is biased radially inwardly until an outer shoulder 86 of the slotway 68 is below the lower surface 35 of the activation plate 32 and the finger members 70 may then snap outwardly under their bias to capture the activation plate 32 in the slotway 68. In FIG. 16, the finger members 70 are coupled to the stem 61 at an inner end 71 axially outwardly from their distal end 72 with the resilient fingers 70 extending radially outwardly and axially inwardly to their distal end.

Figure 17:
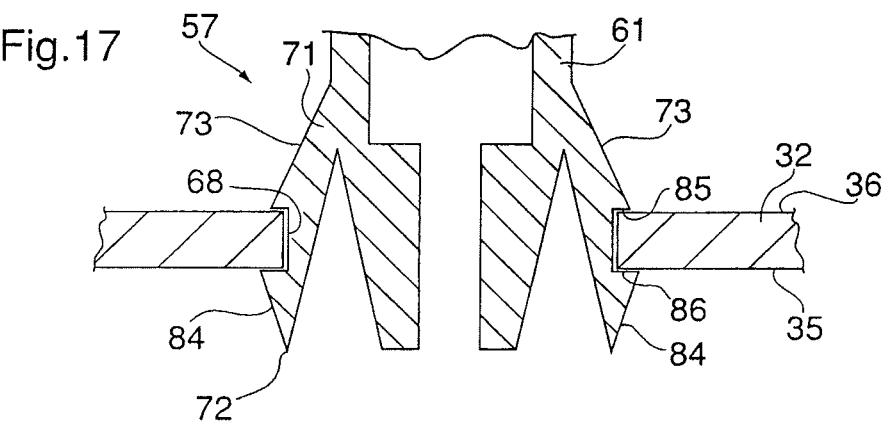

Reference is made to FIG. 17 which is a cross-section similar to FIG. 12, however, showing a sixth embodiment of a piston element 57 substantially the same as in FIG. 16 but with the resilient fingers 70 coupled to the stem 61 at their inner ends 71 axially inwardly from their distal ends 72 and the finger members 70 extending radially outwardly and axially outwardly to their distal ends 72.

Figure 18:
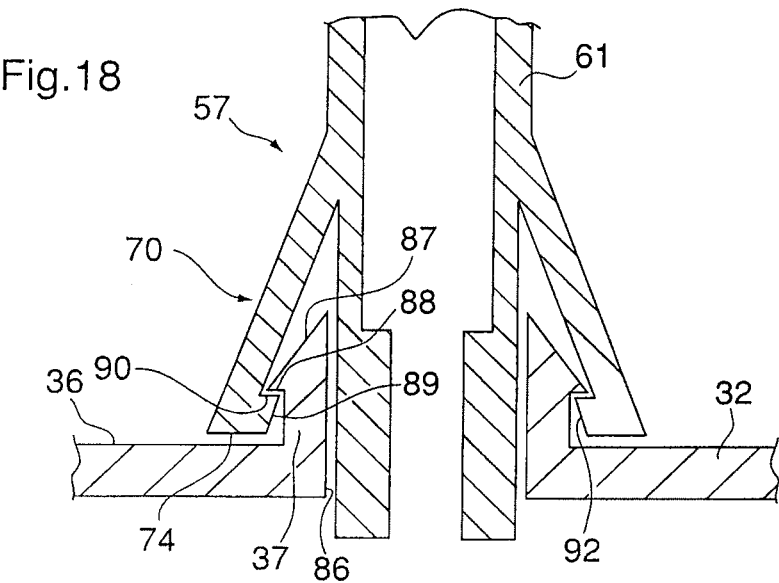

Reference is made to FIG. 18 which is a schematic cross-sectional side view similar to that shown in FIG. 12, however, showing a sixth embodiment of a piston element 57 and a modified actuator plate 32. The actuator plate 32 is shown to include about the catch opening 37 an upwardly extending tube 86. The tube 86 has an inner end with a hook-like configuration which has a radially outwardly and axially inwardly directed camming surface 87 which extends radially outwardly as it extends axially outwardly. A radially outer end of the camming surface 87 ends at an undercut outwardly directed catch shoulder 88. The actuator plate and its tube 86 is formed to be relatively rigid.

The piston element 57 carries a plurality of resilient finger members 70 which are adapted to be deflected radially outwardly. On movement of the piston element 57 downwardly relative to the actuator plate 32, end surfaces 74 and/or camming surfaces 89 on each resilient finger member 70 engage the camming surfaces 87 on the actuator plate 32 biasing the resilient finger members 70 outwardly. The resilient finger members 70 have a hook-like configuration with a radially inwardly directed catch shoulder 90 which is adapted after the catch shoulder 90 has moved downwardly past the catch shoulder 88 on the actuator plate 32 to snap radially inside the catch shoulder 88 on the actuator plate 32 to secure the piston element 57 to the actuator plate 32 in the coupled orientation shown in FIG. 18. Each finger member 70 carries an outer end surface 74. Engagement between the outer end surface 74 and the upper surface 36 of the actuator plate 32 prevents relative movement in one axial direction and engagement between the actuator plate's catch shoulders 88 and the piston's catch shoulders 90 prevents relative movement in the other axial direction. In the embodiment of FIG. 18, an annular slotway 92 is effectively carried on the tube 86 between the catch shoulder 88 and upper surface 36.

While the invention has been described with reference to preferred embodiments, it is not so limited. Many variations and modifications will now occur to persons skilled in the art. For a definition of the invention, reference may be made to the appended claims.

We claim:

1. A dispenser for dispensing material comprising:
a housing,
a reservoir,
the housing supporting the reservoir in a dispensing position,
the reservoir being insertable into said housing to assume said dispensing position and removable therefrom for replacement,
the reservoir comprising:
(i) a material to be dispensed, and
(ii) a mechanism for dispensing the material,
the mechanism comprising a reciprocally movable element for reciprocal movement along an axis relative to the housing when the reservoir is in the dispensing position to dispense material,
the housing including an actuator mechanism for moving the reciprocally movable element along the axis,
the actuator mechanism movable relative the housing between a first position and a second position,
the actuator mechanism including a catch member,
the reciprocally movable element including an engagement mechanism to engage the actuator catch member and couple the reciprocally movable element to the actuator mechanism,
the engagement mechanism comprising a resilient member extending radially outwardly relative the axis from the reciprocally movable element in an unbiased inherent position,
the resilient member being resiliently deflectable radially from the unbiased inherent position to a deflected position of a different radial extent relative the axis than the unbiased inherent position and biased to return to the unbiased inherent position when deflected away from the unbiased inherent position toward the deflected position,
wherein when the reservoir is inserted into the dispensing position, the engagement mechanism and catch member assume an uncoupled orientation from which on a cycling of the actuator mechanism between the first position and the second position, the engagement mechanism and catch member are moved relative to each other such that the catch member is forced axially into the resilient member,
wherein from the uncoupled orientation on relative forcing the catch member axially into the resilient member engagement therebetween deflects the resilient member radially sufficiently to permit the catch member to move axially relative the resilient member from the uncoupled orientation to a coupled orientation in which the engagement mechanism engages the catch member for reciprocal movement of the reciprocally movable element to dispense the material with movement of the actuator mechanism between the first position and the second position, and
wherein in the coupled orientation the resilient member is in the unbiased inherent position.

2. A dispenser as claimed in claim 1, wherein said resilient member comprises a plurality of resilient finger members spaced circumferentially of the axis about the movable element,
each finger member coupled to the movable element at a radially inner end of the finger member and extending radially outwardly to a distal end portion,
each finger member being resiliently deformable from the unbiased inherent position to the deflected position in which the distal end portion is moved radially inwardly sufficiently to let the distal end portion move axially pass the catch member of the actuator member in an axial direction;
when the movable element is in the uncoupled orientation, on first cycling of the actuator member, the actuator member engages the distal end portions of the finger members to deflect the distal end portion to the deflected position and on the movable element assuming the coupled orientation, said distal end portion of the finger members returning to said unbiased inherent position coupling the movable element and catch member of the actuator mechanism in the coupled orientation.

3. A dispenser as claimed in claim 2 wherein the actuator mechanism comprises an actuator plate mounted for movement axially relative to the reciprocally movable element,
the plate having an axially inwardly directed upper surface and an axially outwardly directed lower surface,
the catch member comprising an opening through the plate from the upper surface to the lower surface, the opening having a circumferentially extending perimeter.

4. A dispenser as claimed in claim 3 wherein the engagement mechanism has a first engagement surface normal to the axis,
the catch member having a first engagement surface normal to the axis in an axial direction opposite to an axial direction in which the first engagement surface of the engagement mechanism for engagement with the first engagement surface when the engagement mechanism is in said coupled orientation.

5. A dispenser as claimed in claim 4, wherein the engagement mechanism has a second engagement surface normal to the axis directed in an axial direction opposite to an axial direction in which the first engagement flange surface is directed, and
the catch member further comprises a second engagement surface normal to the axis in an axial direction opposite to an axial direction in which the second engagement surface of the engagement mechanism for engagement with the second engagement surface when the engagement mechanism is in said coupled orientation.

6. A dispenser as claimed in claim 5 wherein said movable element comprises a piston-forming element.

7. A dispenser as claimed in claim 6 wherein axially directed surfaces of the distal end portions of the finger members comprise camming surfaces for engagement with the catch member when the engagement mechanism is in the uncoupled orientation, for engagement with the to deflect the finger members radially.

8. A dispenser as claimed in claim 1 wherein the resilient member being resiliently deflectable radially inwardly from the unbiased inherent position to the deflected position of a reduced radial extent than the unbiased inherent position.

9. A dispenser as claimed in claim 1 wherein the reciprocally movable element comprises an element injection molded from plastic and having the resilient members formed from plastic as an integral element.

10. A dispenser as claimed in claim 3 wherein the movable element includes a stem disposed about the axis,
a discharge passageway centrally through the stem, opening at an outer end of the stem at a discharge outlet through which the material from the reservoir is dispensed,
the finger members having their inner ends coupled to the stem.

11. A dispenser as claimed in claim 10 including an annular slotway provided on the stem coaxially about the axis,
a circumferential perimeter of the opening of the catch member received within the slotway in the coupled orientation to prevent relative axial movement,
axially directed caroming surfaces carried on the finger members for engagement with the perimeter of the opening to bias the finger members radially on relative axial movement of the movable element and the actuator plate from the uncoupled orientation towards the coupled orientation.

12. A dispenser as claimed in claim 11 wherein a stop flange is provided on the stem axially spaced from the finger members with the annular slotway between the finger members and the stop flange,
the stop flange sized to be larger than the opening through the catch member preventing axial movement of the stop flange through the opening, the finger members extending axially from their inner ends to their distal ends axially toward the stop flange.

13. A dispenser as claimed in claim 10 wherein the resilient finger members comprise an outer set of resilient finger members extending axially inwardly from their radially inner end to their distal end,
the finger members having axially outwardly and radially outwardly directed camming surfaces for engagement with the perimeter of the opening to bias the finger members radially inwardly on relative axial movement of the movable element outwardly relative the actuator plate from an uncoupled orientation towards the coupled orientation,
the finger members having an axially inwardly facing catch surface axially inwardly of the radially outwardly directed camming surface to engage the lower surface of the plate in the coupled orientation.

14. A dispenser as claimed in claim 10 wherein the resilient finger members comprise an inner set of resilient finger members extending axially outwardly from their radially inner end to their distal end,
the finger members having axially inwardly and radially outwardly directed camming surfaces for engagement with the perimeter of the opening to bias the finger members radially inwardly on relative axial movement of the movable element inwardly relative the actuator plate from an uncoupled orientation towards the coupled orientation, the finger members having an axially outwardly facing catch surface axially outwardly of the radially outwardly directed camming surface to engage the upper surface of the plate in the coupled orientation.

15. A dispenser as claimed in claim 14 wherein the resilient finger members comprise an inner set of resilient finger members extending axially outwardly from their radially inner end to their distal end,
the finger members having axially inwardly and radially outwardly directed camming surfaces for engagement with the perimeter of the opening to bias the finger members radially inwardly on relative axial movement of the movable element inwardly relative the actuator plate from an uncoupled orientation towards the coupled orientation,
the finger members having an axially outwardly facing catch surface axially outwardly of the radially outwardly directed camming surface to engage the upper surface of the plate in the coupled orientation;
an annular slotway about the stem defined between the inwardly facing catch surfaces of the outer set of finger members and the outwardly facing catch surfaces of the inner set of finger members to receive the perimeter of the opening of the catch member in the coupled orientation to prevent relative axial movement of the movable element and the actuator plate.

16. A dispenser as claimed in claim 13 wherein a stop flange is provided on the stem axially spaced inwardly from the distal ends of the outer set of resilient finger means,
the stop flange sized to be larger than the opening through the catch member preventing axial movement of the stop flange member through the opening,
the stop flange having an axially outwardly directed catch surface to engage the upper surface of the actuator plate,
an annular slotway defined between the stop flange and the distal ends of the finger members to receive the perimeter of the opening of the catch member in the coupled orientation to prevent relative axial movement of the movable element and the actuator plate.

17. A dispenser as claimed in claim 14 wherein a stop flange is provided on the stem axially spaced inwardly from the distal ends of the inner set of resilient finger means,
the stop flange sized to be larger than the opening through the catch member preventing axial movement of the stop flange member through the opening,
the stop flange having an axially inwardly directed catch surface to engage the upper surface of the actuator plate,
an annular slotway defined between the stop flange and the distal ends of the finger members to receive the perimeter of the opening of the catch member in the coupled orientation to prevent relative axial movement of the movable element and the actuator plate.

18. A dispenser as claimed in claim 2 wherein the resilient finger members are formed from a plastic that loses its resiliency when deflected 25 times or less.

19. A dispenser for dispensing fluid comprising:
a housing,
a reservoir,
the housing supporting the reservoir in a dispensing position,
the reservoir being insertable into said housing to assume said dispensing position and removable therefrom for replacement,
the reservoir comprising:
(i) a chamber for retaining fluid having an outlet, and
(ii) a valving mechanism disposed across the outlet for dispensing fluid from the chamber,
the valving mechanism comprising a reciprocally movable element for reciprocal movement along an axis relative to the housing when the reservoir is in the dispensing position to dispense fluid,
the housing including an actuator mechanism for actuating the reciprocally movable element,
the actuator mechanism movable relative the housing between a first position and a second position,
the actuator mechanism including a catch member,
the reciprocally movable element including an engagement mechanism to engage the actuator catch member and couple the reciprocally movable element to the actuator mechanism,
the engagement mechanism comprising a resilient member extending radially outwardly from the reciprocally movable element in an unbiased inherent position,
the resilient member being resiliently deflectable radially from the unbiased inherent position to a deflected position of a different radial extent than the unbiased inherent position and biased to return to the unbiased inherent position when deflected away from the unbiased inherent position toward the deflected position,
wherein when the reservoir is inserted into the dispensing position, the engagement mechanism and catch member assume an uncoupled orientation from which on a cycling of the actuator mechanism between the first position and the second position, the engagement mechanism and catch member are moved relative to each other such that the catch member is forced axially into the resilient member,
wherein from the uncoupled orientation on relative forcing the catch member axially into the resilient member engagement therebetween deflects the resilient member radially sufficiently to permit the catch member to move axially relative the resilient member from the uncoupled orientation to a coupled orientation in which the engagement mechanism engages the catch member for reciprocal movement of the reciprocally movable element to dispense fluid with movement of the actuator mechanism between the first position and the second position, and wherein in the coupled orientation the resilient member returns to the unbiased inherent position.

20. A dispenser for dispensing fluid comprising:
a housing,
a reservoir,
the housing supporting the reservoir in a dispensing position,
the reservoir being insertable into said housing to assume said dispensing position and removable therefrom for replacement,
the reservoir comprising:
(i) a chamber for retaining fluid having an outlet, and
(ii) a valving mechanism disposed across the outlet for dispensing fluid from the chamber,
the valving mechanism comprising a reciprocally movable element for reciprocal movement along an axis relative to the housing when the reservoir is in the dispensing position to dispense fluid,
the housing including an actuator mechanism for actuating the reciprocally movable element,
the actuator mechanism movable relative the housing between a first position and a second position,
the actuator mechanism including a catch member,
the reciprocally movable element including an engagement mechanism to engage the actuator catch member and couple the reciprocally movable element to the actuator mechanism,
the engagement mechanism comprising a resilient member extending radially outwardly from the reciprocally movable element in an unbiased inherent position,
the resilient member being resiliently deflectable radially from the unbiased inherent position to a deflected position of a different radial extent than the unbiased inherent position and biased to return to the unbiased inherent position when deflected away from the unbiased inherent position toward the deflected position,
wherein when the reservoir is in the dispensing position, the engagement mechanism and catch member assume relative positions:
(a) a coupled orientation in which the engagement mechanism engages the catch member for reciprocal movement of the reciprocally movable element to dispense fluid with movement of the actuator mechanism between the first position and the second position, and
(b) an uncoupled orientation from which on a cycling of the actuator mechanism between the first position and the second position, the engagement mechanism and catch member are moved relative to each other such that the catch member is forced axially into the resilient member,
wherein from the uncoupled orientation on relative forcing the catch member axially into the resilient member engagement therebetween deflects the resilient member radially sufficiently to permit the catch member to move axially relative the resilient member from the uncoupled orientation to the coupled orientation,
wherein in the coupled orientation the resilient member returns to the unbiased inherent position.

* * * * *